July 26, 1955    L. R. HERNDON, JR., ET AL    2,713,795
PRESSURE MEASURING DEVICE Filed Dec. 30, 1950      2 Sheets-Sheet 1

INVENTORS
CHARLES A. PIPER
LEE ROY HERNDON JR.
BY ARTHUR M. SMITH

Ellsworth R. Roston
ATTORNEY

July 26, 1955  L. R. HERNDON, JR., ET AL  2,713,795
PRESSURE MEASURING DEVICE
Filed Dec. 30, 1950  2 Sheets—Sheet 2
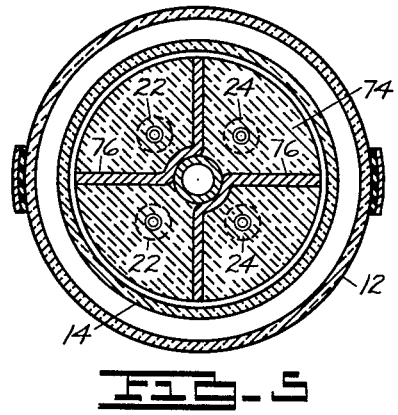
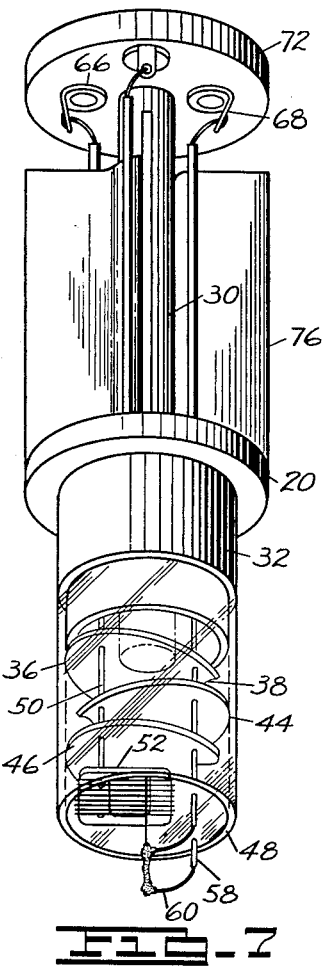
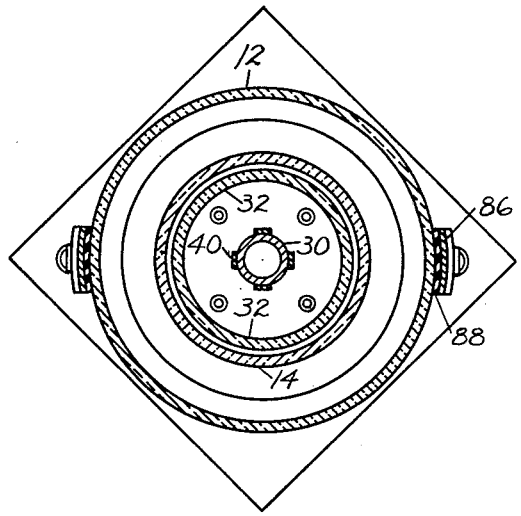
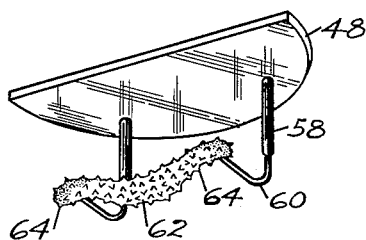
INVENTORS
CHARLES A. PIPER
LEE ROY HERNDON JR.
BY ARTHUR M. SMITH
Ellsworth R. Roston
ATTORNEY United States Patent Office 2,713,795
Patented July 26, 1955

2,713,795

PRESSURE MEASURING DEVICE

Lee R. Herndon, Jr., Charles A. Piper, and Arthur M. Smith, Detroit, Mich., assignors to Bendix Aviation Corporation, Detroit, Mich., a corporation of Delaware Application December 30, 1950, Serial No. 203,669

13 Claims. (Cl. 73—384)

This invention relates to apparatus for measuring the pressure of a fluid and more particularly to compact apparatus for accurately measuring the pressure of a fluid over a wide range of pressures and for a relatively long period of time.

Apparatus is now in use for measuring the pressure of a fluid. One type of apparatus employs a liquid whose boiling temperature varies in accordance with the pressure exerted upon the liquid by the fluid in question. By measuring the temperature at which the liquid boils, a direct indication of fluid pressure may be obtained.

None of the different apparatuses which utilize the boiling point of a liquid to determine the pressure of a fluid recovers the vapor which leaves the liquid. Since the liquid is not recovered, the apparatus is relatively short-lived if a small amount of liquid is used or bulky if a large amount of liquid is used to lengthen its life. Thus, no compact apparatus has existed until now for accurately measuring the pressure of a fluid by determining the boiling point of a liquid and for recovering the vapor which leaves the liquid.

This invention provides a pressure sensor in which the vapor leaving the boiling liquid is condensed and returned to the liquid to increase the life of the sensor materially. Because of the condensation of the vapor for further use, a relatively small amount of liquid is required. This feature, as well as other features, causes the liquid to rise quickly to a boiling temperature upon the application of heat and to thereafter react sensitively to variations in the pressure of the fluid surrounding the sensor. The sensor is compact, highly accurate over a wide range of pressures and inexpensive to manufacture and operate.

An object of this invention is to provide a pressure sensor in which the temperature at which a liquid boils provides an indication of the pressure of a fluid acting upon the liquid.

Another object of the invention is to provide a pressure sensor of the above character in which the liquid boils evenly at a temperature directly related to the pressure of the fluid acting upon the liquid.

A further object of the invention is to provide a pressure sensor of the above character in which the vapor leaving the liquid is condensed and returned to the liquid to prolong the life of the sensor.

Still another object is to provide a pressure sensor of the above character requiring a minimum amount of heat to bring the liquid to the boiling temperature and to maintain the liquid thereafter at the boiling temperature.

A still further object is to provide a pressure sensor of the above character for providing a fast and sensitive response to variations in the pressure of the fluid surrounding the sensor.

Another object is to provide a pressure sensor of the above character which is compact, highly accurate over a wide pressure range, and inexpensive to manufacture and operate.

Other objects and advantages will be apparent from a detailed description of the invention and from the appended drawings and claims.

Figure 2:
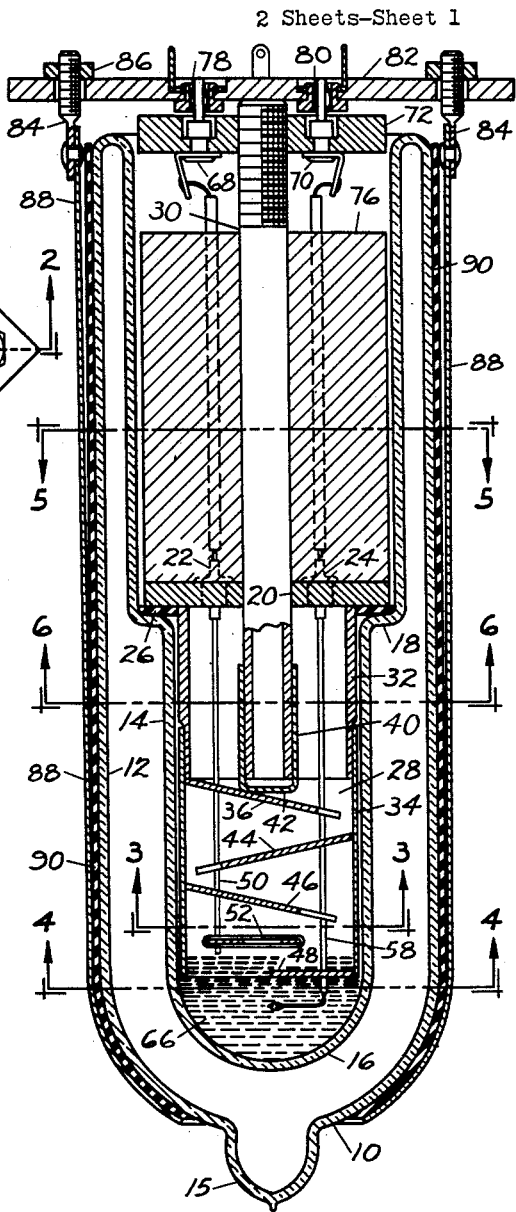
Figure 2 is a sectional view substantially on the line 2—2 of Figure 1.

Figures 3, 4, 5 and 6 are sectional views substantially on the lines 3—3, 4—4, 5—5 and 6—6, respectively, of Figure 2;

Figure 7 is a perspective view of the interior components of the pressure sensor; and Figure 8 is an enlarged perspective view of the wire for heating the liquid in the pressure sensor.

In one embodiment of the invention, a silvered glass container 10 (Figure 2) is provided with an outer wall 12 and an integral inner wall 14 separated from the outer wall by a vacuum. The outer wall 12 has a curved bottom surface terminating in a sealing nipple 15. The inner wall 14 has a curved bottom surface 16 and a shoulder 18 approximately equidistant from its bottom and top surfaces.

Figure 1:
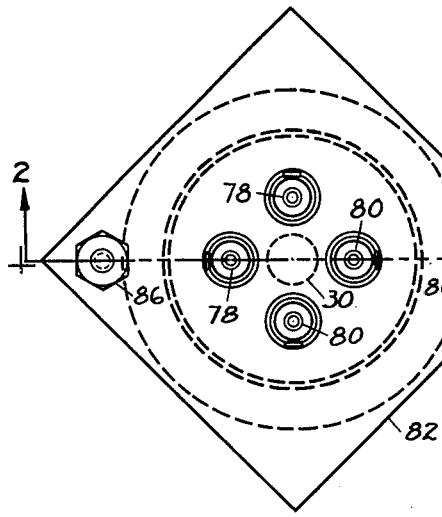
Figure 1 is a top plan view of the pressure sensor.
Figure 3:
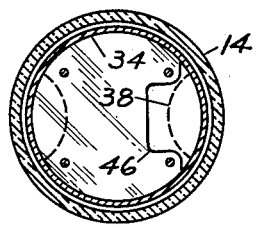
Figure 4:
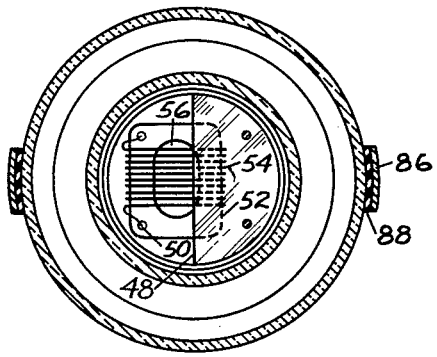

A disc 20 having insulated terminals 22 and 24 (Figures 2 and 5) rests on a gasket 26 seated on the shoulder 18 and forms a sealed compartment 28 with the inner wall 14 and its bottom surface 16. A hollow tube 30 (Figures 1, 2 and 6) having a relatively small diameter extends axially through a centrally disposed hole in the disc, and a hollow cylinder 32 having a slightly smaller diameter than the inner wall 14 extends downwardly from the disc 20. The bottom portion of the cylinder 32, which may be made from a suitable heat-conducting material, is thinner than the top portion and supports as by cement a cylindrical condenser 34 (Figures 2 and 3), made from a plastic material such as cellulose acetate to minimize its heat capacity.

A baffle 36 (Figures 2 and 7) is suitably secured, as by cement, to the condenser 34 at an oblique angle to the condenser. The baffle 36 extends across approximately three-fourths of the width of the condenser 34 and has a curved surface 38 (Figures 3 and 7) at its free end to make the surfaces contacting the condenser as large as possible without any appreciable sacrifice in the area of its cut-away portion. The baffle 36 supports a valve 40 (Figures 2 and 6) having a plurality of legs integrated by a dish 42 (Figure 2). In the operative position of the pressure sensor, the dish 42 is separated from the bottom of the tube 30 so that the openings between the valve legs are continuous with the mouth of the tube.

A second baffle 44 (Figures 2 and 7) similar to the baffle 36 is secured to the condenser 34 below the baffle 36. The baffle 44 is disposed at an oblique angle to the condenser 34 and in staggered relationship to the baffle 36. A third baffle 46 (Figures 2, 3 and 7) lies below the baffle 44 on the opposite side of the condenser from the baffle 44 and extends at an oblique angle across slightly more than half of the width of the condenser. A fourth baffle 48 extends from the same side of the condenser as the baffle 44 for approximately half the width of the condenser.

A pair of stiff electrical leads 50 (Figures 2, 4 and 7) extend from the terminals 22 through the baffles 36, 44 and 46 and support the opposite ends of a plate 52 horizontally disposed between the baffles 46 and 48. The leads 50 are connected to the ends of a number of turns of fine resistance wire 54 (Figure 4) wound on the plate 52. A hole 56 is provided in the plate 52 to expose the turns of wire 54.

Similarly, a pair of stiff electrical leads 58 (Figures 2, 7 and 8) extend from the terminals 24 through the baffles 36, 44, 46 and 48 to the opposite ends of a heater wire 60. The wire 60 has a ceramic coating 62 (Figure 8) embedded with suitable particles 64, such as silicon carbide particles. The wire rests in a suitable liquid 66 (Figure 2), such as a fluorinated hydrocarbon, the upper level of which is between the baffle 48 and plate 52.

In addition to being connected to the resistance wire 54 and the heater wire 60, respectively, the terminals 22 and 24 are connected to male jacks 68 and 70 (Figures 2 and 7), respectively, in a plug 72. The plug screws on the threaded upper end of the tube 30 and defines with the disc 20 a compartment filled with a suitable cooling material 74 (Figure 5), such as Dry Ice. Fins 76 (Figures 2 and 5) extend from the tube 30 through the compartment to provide for an efficient cooling action by the material 74.

The male jacks 68 and 70 fit in female jacks 78 and 80 (Figures 1 and 2), respectively, in a cover 82 having holes through which spades 84 extend. Nuts 86 screw on the spades 84 at one end to secure the spades to the cover 82, and at the other end rivets secure the spades 84 to the arms of a spring clamp 88. The clamp 88 fits over the nipple 15 of the container 10 and extends upwardly along the outer wall 12 of the container. A rubber pad 90 fits between the clamp 86 and the outer wall 12 to protect the wall.

Fluid at the pressure to be measured enters the pressure sensor through the tube 30 and occupies the space above the liquid 66. The fluid applies a downward pressure upon the liquid 66 to impede the vaporization of the liquid. When a sufficient electric current is passed through the wire 60, however, the upward pressure exerted by the vapor from the liquid 66 exceeds the downward pressure of the fluid, and the liquid boils. As the vapor rises from the liquid 66, it passes over the wire 54 and causes the resistance of the wire to increase. The resistance of the wire assumes a value directly related to the temperature at which the liquid 66 boils, the boiling temperature of the liquid in turn being directly related to the pressure of the fluid upon the liquid 66. As a result, the wire resistance provides a direct and accurate indication of the fluid pressure, the error being less than 0.5% of the measured pressure over an atmospheric pressure range corresponding to altitudes from 0 to 100,000 feet.

As the vapor leaving the liquid 66 passes upwardly, it is cooled by the Dry Ice 74 until it finally condenses. The condensate runs down the baffles 36, 44 and 46 and drops down into the liquid 66 to maintain the liquid volume substantially constant. The condensate moving downwardly is heated by the vapor moving upwardly so that it needs only the heat of vaporization to become vaporized again. A continuous cycle of vaporization and condensation is thus provided to prolong the life of the pressure sensor for a considerable period of time.

The pressure sensor disclosed above has a number of advantages over other apparatus now in use. The continuous cycle of vaporization and condensation minimizes the amount of liquid required and produces a decrease in the amount of time required for the liquid to rise initially to the boiling temperature upon the application of heat. After the liquid 66 has reached the boiling temperature, the relatively small amount of liquid required causes the sensor to react quickly and sensitively, by changes in the boiling temperature, to variations in the pressure of the surrounding fluid. Because of the relatively small amount of liquid which is used and the curvature of the bottom wall 16, the depth of the liquid is relatively shallow, causing the sensor to respond sensitively and accurately even when the pressure of the fluid surrounding the sensor is relatively low.

By providing the wire 60 with a ceramic coating 62 impregnated with silicon carbide particles 64, a porous surface having sharp points to facilitate the formation of bubbles is formed. This produces an increase in the effective surface area of the wire 60 and an enhancement of the thermal contact between the wire 60 and the liquid 66. As a result, an even formation of bubbles is obtained at the actual boiling temperature of the liquid, even with an excessive amount of heat introduced to the liquid from the wire 60. In addition to preventing "bumping"—i. e., the uneven formation of bubbles—the ceramic coating 62 also prevents an oxide coating from being formed on the wire 60 to affect the heat transfer characteristics of the wire.

The apparatus disclosed above not only provides for an even formation of bubbles in the liquid, but also for an even exit of the vapor from the liquid. Since the baffle 48 blocks the right side of the container 10 as seen in Figure 2, the vapor must leave on the left side and must travel between the baffle 48 and the baffle 46 to pass through the opening provided by the baffle 46. The circuitous path between the baffles 48 and 46 channels any turbulence which may result and thereby produces an efficient heat transfer between the vapor leaving the liquid and the condensate returning to the liquid. The circuitous path also insures that a sufficient amount of vapor will pass over the wire 54 to bring the wire substantially to the boiling temperature. Since the wire 54 is very close to the liquid level, it is further maintained at the proper temperature by liquid which bubbles upwardly through the hole 56 in the plate 52 and then splashes over the plate.

The baffles 44 and 36 further lengthen the path of the vapor, thereby increasing the condensation action of the Dry Ice 74. The cooling action on the vapor is also provided by the cylinder 32 and by the condensate which flows downwardly along the baffles. As previously explained, the condensate is in turn heated by the vapor so that it requires only a minimum amount of heat—i. e., the heat of vaporization—for the vaporization cycle to be repeated after it drops down into the liquid 66.

The pressure sensor disclosed above may be used as a hypsometer to measure air pressure over a considerable range of altitudes, such as 0 to 100,000 feet. The pressure sensor may be included in equipment for transmitting the resistance values of the wire 60, as disclosed in copending application Serial No. 183,717, filed September 8, 1950, by Charles A. Piper. The transmitting equipment may be quickly carried by a rocket to a height of 100,000 feet and may then be released from the rocket for slow descent by parachute to the ground. During the ascent of the rocket, the pressure sensor is inverted, so that the disc 20 serves as the bottom of the compartment 28 and the liquid 66 rests on the disc 20 between the cylinder 32 and the tube 30, which is closed by the valve 40. Since the compartment 28 is closed, the liquid 66 cannot leak. When the transmitting equipment starts to descend slowly towards the ground, the pressure sensor reverts to its normally upright position and the liquid 66 rests on the bottom surface 16 in a position to receive heat from the wire 20. During the descent of the transmitting equipment, the equipment sends to a ground station for recordation and analysis information as to the atmospheric pressure and the altitude at which the pressure values are being obtained.

There is thus provided apparatus for accurately measuring the pressure of a gas over a wide range of values. The apparatus provides an even heating of a liquid so that the liquid boils at a temperature directly related to the gas pressure. The apparatus also operates on a reflux basis to condense the vapor as it leaves the liquid and to return the condensate in a form which requires only a minimum amount of heat to vaporize the condensate again.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A pressure sensor, including, a container, means providing a coupling between the container and fluid outside of the container, a liquid in the container adapted to boil at a temperature related to the pressure of the fluid surrounding the container, means for boiling the liquid at the required temperature, a plate disposed within the container in contiguous relationship to the liquid, there being an opening in the plate, an electrical temperature measuring means including a resistance disposed on the plate to receive the liquid bubbling up through the opening in the plate so as to provide a resistance value indicative of the boiling temperature of the liquid, means for condensing the vapor, and a plurality of baffles disposed in the container to heat the condensate as it returns to the liquid so that only a minimum amount of heat is required to vaporize the condensate again.

2. A pressure sensor, including, a heat-insulated container, means forming a compartment within the container, means communicating between the compartment and the fluid outside of the container, a wire in the liquid for heating the liquid upon the passage of an electric current, a porous coating on the wire for providing an even boiling of the liquid at a temperature corresponding to the pressure of the fluid surrounding the container, a plate disposed a relatively short distance above the level of the liquid, there being an opening in the plate, an electrical temperature measuring means including a resistance disposed on the plate to receive liquid bubbling up through the opening in the plate so as to assume a resistive value dependent upon the boiling temperature of the liquid, means for condensing the vapor to prolong the boiling operation, and means for returning the condensate to the liquid in a sinuous path to heat the condensate to a temperature requiring a minimum amount of heat for vaporization.

3. A pressure sensor, including, a heat-insulated container, means forming a compartment within the container, means communicating between the compartment and the fluid outside of the container, a wire in the liquid for heating the liquid upon the passage of an electric current, a porous, prickly coating on the wire for providing an even boiling of the liquid at a temperature corresponding to the pressure of the fluid surrounding the container, means for providing an indication of the temperature at which the liquid boils, means for condensing the vapor to prolong the boiling operation, and a plurality of baffles disposed within the sealed compartment in staggered relationship and at progressive heights to direct the return of the condensate to the liquid in a staggered path to heat the condensate to a temperature requiring substantially only the heat of vaporization to vaporize it again.

4. A pressure sensor, including, a container, a liquid in the container, means for exposing the liquid to a fluid outside of the container, means in the liquid for heating the liquid to boil at a temperature corresponding to the pressure of the fluid, means for measuring the temperature at which the liquid boils, means for providing a condensing action on the vapor leaving the liquid, and a plurality of baffles disposed in the container in staggered relationship and at progressive heights to return the condensate to the liquid in a sinuous path common to the vapor leaving the liquid so as to produce a maximum amount of heat transfer between the vapor and the condensate.

5. A pressure sensor, including, a container, means for providing a compartment in the container in the upright position of the pressure sensor, a heat-responsive liquid in the compartment, means for exposing the liquid to a fluid outside of the container, means for heating the liquid evenly to boil at a temperature related to the pressure of the fluid, means for measuring the temperature at which the liquid boils, means for providing a condensing action on the vapor leaving the liquid, a plurality of baffles disposed in the container in staggered relationship and at progressive heights to increase the length of the path for directing the vapor from the liquid and for returning the condensate to the liquid so as to provide an optimum transfer of heat between the condensate and the vapor, and means for retaining the liquid within the compartment in the inverted position of the container.

6. A pressure sensor, including, a container, a liquid in the container, means for exposing the liquid to a fluid outside of the container, means for heating evenly the liquid to boil at a temperature corresponding to the pressure of the fluid, an electrical temperature measuring means including a resistance disposed above the liquid in contiguous relationship to the liquid to measure the temperature at which the liquid boils, a plate for supporting the resistance, there being an opening in the plate to provide for the passage to the resistance of bubbling liquid so that the resistance attains a value dependent upon the boiling temperature of the liquid, means for providing a cooling action on the vapor leaving the liquid, and a plurality of baffles disposed in the container in staggered relationship relative to one another to provide an effective transfer of heat between the vapor leaving the liquid and the condensate returning to the liquid.

7. A pressure sensor, including, a container, means forming a substantially closed compartment within the container, means communicating between the compartment and the surrounding atmosphere, a liquid within the container, means for evenly heating the liquid to provide a smooth boiling at a temperature directly related to the fluid pressure, a wire having a resistance directly related to the temperature at which the liquid boils, and means for providing a condensing action on the vapor leaving the liquid, the condensing means including a plurality of baffles disposed in staggered relationship at progressive heights in the compartment to facilitate the condensation of the vapor and to minimize the heat required to vaporize again the condensate returning to the liquid.

8. A pressure sensor, including, a container, a liquid in the container, means providing a communication between the liquid in the container and fluid outside of the container, means for heating the liquid to a boiling temperature dependent upon the pressure of the fluid in the container, means for providing an indication of the boiling temperature, means for condensing the vapor leaving the liquid, and a plurality of baffles disposed within the container in staggered relationship and at progressive heights to provide a transfer of heat between the vapor leaving the liquid and the condensate returning to the liquid so as to vaporize the condensate again with a minimum amount of additional heat.

9. A pressure sensor, including, a container, a liquid in the container, means providing a communication between the liquid in the container and fluid outside of the container, means for evenly heating the liquid to a boiling temperature dependent upon the pressure of the fluid in the container, a resistance disposed in the container in contiguous relationship to the liquid to provide an indication of the boiling temperature, means for condensing the vapor, and a plurality of baffles positioned in the container between the condensing means and the liquid and in staggered relationship and at progressive heights to provide an effective transfer of heat between the vapor leaving the liquid and the condensate returning to the liquid so as to require substantially only the heat of vaporization to vaporize the condensate again.

10. A pressure sensor, including, a container, means forming a substantially closed compartment within the container, means communicating between the compartment and fluid outside of the compartment, means for evenly heating the liquid to provide a smooth boiling at a temperature directly related to the pressure of the fluid in the compartment, a plate disposed in contiguous relationship to the liquid, there being an opening in the plate, a resistance wire wound on the plate to receive the liquid bubbling up through the opening in the plate so as to provide an indication of the temperature at which the liquid boils, means for condensing the vapor leaving the liquid, and a plurality of baffles disposed within the container in staggered relationship and at progressive heights to provide a sinuous path for channeling the flow of vapor leaving the liquid and condensate returning to the liquid so as to provide an efficient transfer of heat between the vapor and the condensate.

11. A pressure sensor, including, a container, means for providing a compartment in the container, a heat-responsive liquid in the compartment, means for exposing the liquid to a fluid outside of the liquid, means in the liquid having a porous, prickly coating for heating the liquid to boil at a temperature related to the pressure of the fluid, means for measuring the temperature at which the liquid boils, means for condensing the vapor leaving the liquid, and a heat exchanger, including a plurality of baffles arranged in staggered relationship and at progressive heights between the liquid and the condensing means, for transferring heat between the vapor leaving the liquid and the condensate returning to the liquid so as to require only a minimum amount of heat to vaporize the condensate again.

12. A pressure sensor, including, a container, means forming a substantially sealed compartment within the container, a tube extending into the compartment to provide a communication between the compartment and fluid outside of the compartment, a heat-responsive liquid in the compartment, means for heating the liquid to a boiling temperature dependent upon the pressure of the fluid in the compartment, means for indicating the temperature at which the liquid boils, means for condensing the vapor leaving the liquid, a plurality of baffles arranged in staggered relationship and at progressive heights between the liquid and the condensing means to provide a transfer of heat between the vapor leaving the liquid and the condensate returning to the liquid, and a valve fitting on the tube and having openings for providing a channel between the tube and the compartment in the upright position of the container and having a portion for sealing the compartment against any loss of liquid in the inverted position of the container.

13. A pressure sensor, including, a first compartment, a second compartment adjacent to the first compartment, a tube open to the atmosphere at one end and extending through the second compartment into the first compartment to provide a communication between the first compartment and fluid in the surrounding atmosphere, a heat-responsive liquid in the first compartment, means for heating the liquid to a boiling temperature dependent upon the pressure of the fluid in the first compartment, an electrical temperature measuring means including, a heat-responsive resistance disposed in contiguous relationship to the liquid to indicate the temperature at which the liquid boils, means in the second compartment for condensing the vapor leaving the liquid, and a plurality of baffles arranged in staggered relationship in the first compartment and at progressive heights between the liquid and the second compartment to provide a transfer of heat between the vapor leaving the liquid and the condensate returning to the liquid.

References Cited in the file of this patent

UNITED STATES PATENTS

| | | |
|---|---|---|
| 1,754,963 | Osborn | Apr. 15, 1930 |
| 2,252,750 | Basch | Aug. 19, 1941 |
| 2,432,169 | Morgan et al. | Dec. 9, 1947 |
| 2,510,533 | Udale | June 6, 1950 |
| 2,533,615 | Asterheld | Dec. 12, 1950 |
| 2,599,276 | Norman | June 3, 1952 |
| 2,677,279 | Rich | May 4, 1954 |

FOREIGN PATENTS

| | | |
|---|---|---|
| 269,480 | Germany | Jan. 21, 1914 |
| 514,355 | Great Britain | Jan. 26, 1938 |
| 519,083 | Great Britain | Mar. 15, 1940 |

OTHER REFERENCES

General News Bureau, Advance News Release of the General Electric Co. May 6, 1949; 3 pp.